United States Patent
Senzaki et al.

(10) Patent No.: US 7,049,389 B2
(45) Date of Patent: May 23, 2006

(54) PROCESS FOR PREPARING OF AROMATIC OLIGOMERS

(75) Inventors: Toshihide Senzaki, Fukuoka (JP);
Takahiro Imamura, Fukuoka (JP);
Kazuyoshi Horibe, Fukuoka (JP);
Tomoaki Yoshida, Fukuoka (JP);
Atsuhiko Katayama, Fukuoka (JP);
Yasuo Wada, Fukuoka (JP); Katsuhide Noguchi, Fukuoka (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/496,139

(22) PCT Filed: Dec. 26, 2002

(86) PCT No.: PCT/JP02/13632

§ 371 (c)(1),
(2), (4) Date: May 20, 2004

(87) PCT Pub. No.: WO03/055927

PCT Pub. Date: Jul. 10, 2003

(65) Prior Publication Data

US 2004/0266976 A1 Dec. 30, 2004

(30) Foreign Application Priority Data

Dec. 27, 2001 (JP) ............................. 2001-396952

(51) Int. Cl.
*C08G 10/02* (2006.01)
*C07C 7/10* (2006.01)

(52) U.S. Cl. ........................ 528/232; 528/242; 528/247
(58) Field of Classification Search ................ 528/232, 528/242, 247
See application file for complete search history.

(56) References Cited

U.S. PATENT DOCUMENTS 6,613,947 B1 * 9/2003 Naik et al. .................. 568/726

FOREIGN PATENT DOCUMENTS

| JP | 61-027930 A1 | 2/1986 |
| JP | 02-134332 A1 | 5/1990 |
| JP | 05-320295 A1 | 12/1993 |

OTHER PUBLICATIONS

J. Gordon Robinson et al., "The Reaction of Naphthalene with Formaldehyde in the Presence of Sulphuric Acid", The British Polymer Journal, Jun. 1980, vol. 12, No. 2, pp. 61 to 69.
International Search Report for PCT/JP02/13632 mailed on Apr. 15, 2003.
English Translation of International Preliminary Examination Report for PCT/JP2002/013632 mailed on Jul. 22, 2004.

* cited by examiner

*Primary Examiner*—Jeffrey Mullis
(74) *Attorney, Agent, or Firm*—Rader, Fishman & Grauer

(57) ABSTRACT

This invention relates to a process for preparing high-purity aromatic oligomers by effectively separating an organic layer containing aromatic oligomers or the reaction products of a polycyclic aromatic compound with formaldehyde from an aqueous layer containing an acid catalyst in a simplified manner, hitherto regarded difficult to accomplish, and obtaining high-purity aromatic oligomers from the organic layer containing a reduced amount of impurities. In separating the aqueous layer containing the acid catalyst and the organic layer containing the oligomers from the reaction mixture formed by the condensation of a polycyclic aromatic compound and formaldehyde, the emulsion phase is broken by adding a nonionic or cationic surfactant in an effective amount and an alkali in an amount sufficient to neutralize 1–70% of the acid in the acid catalyst, the organic and aqueous layers are separated and the aromatic oligomers are recovered from the organic layer.

13 Claims, No Drawings

PROCESS FOR PREPARING OF AROMATIC OLIGOMERS

FIELD OF TECHNOLOGY

This invention relates to a process for preparing aromatic oligomers by the reaction of an aromatic compound with formaldehyde in the presence of an acid catalyst. In the cases where the removal of the acid catalyst is effected by transferring it to the aqueous layer and separating the aqueous layer from the organic layer, this separation is made difficult to perform in some systems by generation of emulsions and the like. This invention particularly relates to a marked improvement in the separation of the organic and aqueous layers in such systems.

BACKGROUND TECHNOLOGY

It is known that resinous materials can be synthesized by the reaction of an aromatic compound with formaldehyde (for example, JP53-24973 B). Meanwhile, J. Gordon Robinson and co-worker reported their research on the synthesis of aromatic resins by the reaction of naphthalene with formaldehyde in the presence of sulfuric acid (The British Polymer Journal, June, 1980, pp. 61–69) and, for the separation of the sulfuric acid catalyst, they used a large amount of 1,2-dichloroethane and an adequate amount of benzyldimethyldodecylammonium chloride as a surfactant to separate the organic and aqueous layers. This procedure was adopted because of an extreme difficulty of separating the organic and aqueous layers.

It is thus publicly known that the organic layer can be separated from the aqueous layer by the use of a surfactant as a demulsifier in the aforementioned reaction. However, even the addition of a surfactant has faced problems such as contamination of aromatic oligomers recovered from the organic layer due to insufficient separation of the organic and aqueous layers and necessity for use of large quantities of an organic solvent.

DISCLOSURE OF THE INVENTION

This invention provides a process for preparing aromatic oligomers which is based on the reaction of an aromatic compound with formaldehyde in the presence of an acid catalyst and is characterized by markedly improved separability of the aqueous layer containing the acid catalyst from the organic layer after the reaction. Moreover, this invention provides a simplified process for removing minute quantities of acids, water and metals such as sodium remaining in the organic layer.

This invention relates to a process for preparing aromatic oligomers wherein an aromatic compound is allowed to react with formaldehyde in the presence of an acid catalyst and the acid catalyst is removed from the reaction mixture by transferring it to the aqueous layer and separating the aqueous layer from the organic layer and the process of this invention comprises adding to the reaction mixture a surfactant as a demulsifier and a water-soluble alkali in such an amount as to neutralize 1% to 70% of the existing acid catalyst to improve the separability of the organic and aqueous layers.

The process for preparing aromatic oligomers according to this invention will be described in detail below. The reaction of an aromatic compound with formaldehyde in the presence of an acid catalyst to give aromatic oligomers is publicly known and any publicly known conditions can be adopted as long as a water-soluble acid catalyst is used. The reaction of an aromatic compound with formaldehyde yields aromatic methylolated products which further react with the aromatic compound to yield resinous products. There are occasionally instances where the products predominantly consist of aromatic compounds having free methylol groups are called aromatic methylolated products or instances where the products in which free methylol groups exist in small quantities are called aromatic resins. The products contain aromatic oligomers in either case and, in this invention, the resinous products obtained by the reaction of an aromatic compound with formaldehyde are referred to as aromatic oligomers. Aromatic oligomers having either a large or small amount of free methylol groups can usually be prepared by controlling the molar ratio of aromatic compound to formaldehyde. Aromatic oligomers generally have on the average 2 to 10, preferably 2 to 5, of aromatic compound units in the molecule.

The aromatic compounds useful for this invention include aromatic compounds containing one or two rings such as xylene, naphthalene, methylnaphthalene, dimethylnaphthalene and biphenyl, aromatic compounds containing three rings such as acenaphthene, fluorene, anthracene, phenanthrene and terphenyl, aromatic hydrocarbons containing four rings such as pyrene and heterocyclic aromatic compounds such as benzothiophene, methylbenzothiophene and dibenzothiophene. Preferable are aromatic hydrocarbons or heterocyclic aromatic compounds containing 1 to 3 rings and they may be substituted by alkyl groups containing 1 to 6 carbon atoms, phenyl group, or aralkyl groups containing 7 to 9 carbon atoms. Here, an aromatic hydrocarbon is advantageously selected from xylene, naphthalene, methylnaphthalene, dimethylnaphthalene, biphenyl, anthracene, phenanthrene, pyrene and their derivatives substituted with alkyl groups containing 1 to 6 carbon atoms. More preferable are polycyclic aromatic hydrocarbons such as naphthalene, methylnaphthalene and dimethylnaphthalene and mixtures of these polycyclic aromatic hydrocarbons such as aromatic oils.

In the cases where a polycyclic aromatic compound is used as a reactant, the compound, for example, may be an aromatic hydrocarbon oil containing 90 wt % or more of naphthalene, high-purity naphthalene or an aromatic hydrocarbon oil mainly containing naphthalene. Available as such hydrocarbon oils are the naphthalene oil fraction, methylnaphthalene oil fraction and intermediate oil fraction derived from coal tar or the intermediate products and residual oils obtained by recovering the principal components of these fractions by distillation, extraction and the like. These naphthalene- or methylnaphthalene-containing oils often occur as mixtures of the principal components and polycyclic aromatic hydrocarbons whose boiling points are close to each other. An aromatic hydrocarbon to be used in the reaction is usually a mixture unless a pure raw material is used.

A naphthalene-containing aromatic hydrocarbon oil naturally contains aromatic hydrocarbons as main components and may additionally contain heterocyclic aromatic compounds having N, S, O and the like in the ring, aromatic compounds having functional groups containing these hetero atoms or inert aliphatic hydrocarbons. An aromatic hydrocarbon oil containing 90 wt % or more of naphthalene may be refined naphthalene, but a preferred example is 95% grade naphthalene. This particular material contains benzothiophene, methylnaphthalene and the like in addition to naphthalene.

The existence of a phenol such as phenol, alkylphenol and naphthol in the reaction is effective for giving a proper degree of polarity to the product oligomers and it is sometimes desirable to add a phenol in a small amount equal to, say, 50 wt % or less, preferably 1–30 wt %, of the aforementioned aromatic compound.

Formaldehyde to be used in this invention may be formaldehyde itself or a compound which is capable of generating formaldehyde in the reaction system and formaldehyde, formalin, paraformaldehyde and the like can be used. It is advantageous to use paraformaldehyde.

Formaldehyde or a compound capable of generating formaldehyde in the reaction is required to raise the molecular weight of aromatic oligomers and to raise the conversion of an aromatic hydrocarbon such as naphthalene. However, where excessive formaldehyde is used, there is an increased possibility of gelation occurring or terminal methylol group remaining behind in large quantities. In consequence, in the cases where the target product is aromatic oligomers containing a large quantity of aromatic methylolated products, the molar ratio of aromatic compound to formaldehyde or compound capable of generating formaldehyde in the reaction (as HCHO) is controlled at 2 or more, preferably at 3–4. In the cases where the target product is aromatic oligomers containing a small quantity of aromatic methylolated products, the molar ratio is controlled at 0.5–3, preferably at 0.6–2.0.

The catalysts to be used in the reaction for preparing aromatic oligomers according to this invention are acids and their examples are inorganic acids such as sulfuric acid, phosphoric acid and hydrochloric acid and water-soluble organic acids (including those which become water-soluble after decomposition by water) such as oxalic acid and toluenesulfonic acid. Preferred acid catalysts include an aromatic sulfonic acid such as toluenesulfonic acid, sulfuric acid and hydrochloric acid. Although the amount of acid catalyst to be used varies with the kind of catalyst, it is generally 0.5–20 wt % (computed as water-free acid catalyst) of the raw materials for the reaction.

The reaction is normally carried out at a temperature of 50–180° C., preferably 60–120° C., for a period of 0.5–5 hours, preferably 2–5 hours, although the conditions vary with the raw material and catalyst in use.

According to this invention, an aromatic compound is allowed to react with formaldehyde to yield a reaction mixture. This reaction can proceed in the presence or absence of water. When the acid catalyst and formaldehyde are used as aqueous solutions, the existence of water leads to the formation of organic and aqueous layers. An acid catalyst such as sulfuric acid is frequently used after dilution with water or dissolution in water and the acid is used at or above a certain concentration as a decrease in concentration causes a decrease in activity. The reaction mixture is influenced by the polymers and methylolated products being formed as the reaction progresses; as a result, the organic layer and the aqueous layer form a suspension or emulsion in many cases and it is impossible to separate the two layers by leaving them standing.

In the cases where the amount of water present is insufficient to form organic and aqueous layers or not adequate for separating the layers, water is added after completion of the reaction either as an aqueous alkaline solution or as water itself. In such cases, water is added in an amount more than sufficient to form organic and aqueous layers and an adequate amount here is the one which allows formation of an aqueous layer 0.1–2 times, preferably 0.1–1 times, the organic layer in volume.

Upon completion of the reaction, an organic solvent may be added if necessary. Any kind of organic solvent that is readily soluble in the organic layer may be used and preferred solvents include benzene, toluene, xylene, ethylbenzene, diethylbenzene, isopropylbenzene, tetralin and decalin. The temperature during the addition varies with the organic solvent; in the case of toluene, for example, a temperature below the boiling point is desirable to prevent the liquid from flowing when left standing or a temperature of 70–90° C. is particularly desirable at normal pressure. The addition of an organic solvent not only lowers the viscosity of the organic layer but also improves the oil-water separability. The organic solvent is added in a volume 0.05–1 times that of the organic layer, preferably in a volume equal to 10–50% of the organic layer. In the cases where the raw material aromatic compound is used in a large amount and it remains largely unreacted, an aromatic solvent may not be added or may be added in a smaller amount than the aforementioned.

The addition of an organic solvent and water is effective for adjusting the specific gravity which is an important factor for the separation of layers.

To improve the separability of the organic and aqueous layers, a surfactant as a demulsifier and an alkali are added according to this invention. Nonionic and cationic surfactants are preferable in respect to separating performance; however, cationic surfactants such as quaternary ammonium salts, though effective, at times impart an offensive odor to resins thereby degrading their commercial value. Moreover, it is advantageous to use nonionic surfactants because of poor separating performance of anionic surfactants. A surfactant is added in an amount equal to or more than the amount which is effective for functioning as a demulsifier, preferably at a rate of 0.01–1 part by weight per 10.0 parts by weight of the aqueous layer.

The nonionic surfactants useful for this invention include polyoxyethylene alkyl ethers, polyoxyethylene dialkylphenyl ethers, polyoxyethylene carboxylic acid esters and polyoxyethylenepolyoxypropylene block copolymers. They further include polyethylene glycol type surfactants such as higher alcohol ethylene oxide adducts, alkylphenol ethylene oxide adducts, fatty acid ethylene oxide adducts, polyhydric alcohol fatty acid ester ethylene oxide adducts, higher alkylamine ethylene oxide adduct, fatty acid amide alkylamine ethylene oxide adducts, fat (or oil) ethylene oxide adducts and polypropylene glycol ethylene oxide adducts and polyhydric alcohol type surfactants such as glycerol fatty acid esters, pentaerythritol fatty acid esters, sorbitol (or sorbitanic acid) fatty acid esters, sucrose fatty acid esters, polyhydric alcohol alkyl ethers and alkanolamine fatty acid amides. They are not limited to the aforementioned surfactants. Moreover, commercial products trade named Demulfer D989 and D981 are available from TOHO Chemical Industry Co., Ltd.,. The surfactants such as nonionic surfactants with an HLB of 8–18, preferably 10–15, are suitable.

Demulsifiers are widely used in the oil industry to separate water from emulsions in the crude oil and they can be used here.

The alkalis useful for this invention are water-soluble alkalis such as sodium hydroxide, potassium hydroxide and sodium carbonate. "Water-soluble" means that not only alkalis themselves are water-soluble but also the salts to be formed by their reaction with acid catalysts are water-soluble. In consequence, calcium hydroxide cannot be used when the catalyst is sulfuric acid, but it can be used when the catalyst is hydrochloric acid. Moreover, "alkali" means a substance which can neutralize an acid catalyst and its examples are hydroxides and weak acid salts such as carbonates of alkali metals and alkaline earth metals. Sodium hydroxide is preferred as it is readily available and soluble in many acids. The alkali here may be used in the form of an aqueous solution or a high-purity solid, but it is easy to handle in the form of an aqueous solution.

The alkali is added in such an amount as to neutralize a part of the acid catalyst in the reaction mixture or to neutralize 1–70%, preferably 5–50%, of the acid catalyst. The alkali thus added equals 1–70%, preferably 5–50%, of the acid catalyst on an equivalent basis. The addition of the alkali is made by titrating a part of the reaction mixture or a part of the solution containing the reaction mixture with the alkali, determining the total amount of the alkali (A) required to neutralize the whole and adding the alkali in an amount equal to 1–70% of A. Too little or too much alkali often fails to separate the interface between the aqueous and organic layers or allows a large emulsion layer to remain behind. Since separate addition of the salt is not effective and only partial neutralization is effective for some unknown reason, this effectiveness of partial neutralization seems to be due to the electrostatic effect of the interface during neutralization.

In the cases where the reaction product or a solution of the reaction product in water or an organic solvent has an organic layer, aqueous layer and emulsified layer which can be separated partially from one another as they are, a part of the organic or aqueous layer may be separated in advance. Thereafter, a surfactant and alkali are added to separate the remaining layers or mainly the emulsified layer. In this case, the amounts of the surfactant and alkali to be added are calculated on the basis of the remaining layers. Where it is not clear whether the emulsified layer is an aqueous layer or an organic layer, the calculation is made by assuming that one half of the emulsified layer is aqueous and another half is organic.

The aforementioned procedure improves the liquid-liquid separation which has formerly been impossible to perform and it becomes possible to separate the aqueous layer containing the catalyst from the organic layer containing the aromatic oligomers (and an organic solvent if added). Thereafter, an adsorbent which can act as a neutralizing agent is added to the organic layer and thoroughly mixed in order to neutralize the residual acids and remove the residual water and residual metals such as Na. Calcium carbonate, calcium hydroxide or the like is added as an adsorbent. The adsorbent thus added absorbs water, neutralizes the residual acids and still more, adsorbs residual sodium. The added adsorbent is thoroughly mixed with the organic layer and thereafter it can be removed readily by filtration and the like. The amount of adsorbent such as calcium carbonate and calcium hydroxide is 0.01–10 parts by weight, preferably 0.02–2 parts by weight, per 100 parts by weight of the organic layer.

The organic layer is then submitted to distillation thereby first distilling low-boiling substances such as water, formaldehyde and the organic solvent and then distilling the unreacted raw material and other fractions while raising the temperature to 200–300° C. under reduced pressure. The residue is aromatic oligomers consisting of aromatic resins or aromatic methylolated products. In the cases where neutralization by the use of an adsorbent such as calcium carbonate is not performed, the reaction proceeds during distillation and it sometimes becomes difficult to control the structure and molecular weight of the target aromatic oligomers.

PREFERRED EMBODIMENTS OF THE INVENTION

This invention is described below with reference to examples. In the examples, % and part are respectively on a weight basis.

EXAMPLE 1

In a flask were placed 250 parts of coal-derived crude naphthalene (content of naphthalene, 96%) and 50 parts of 88% paraformaldehyde and a condenser was attached to the flask. The mixture was kept at 100° C., 60 parts of 70% sulfuric acid was added in drops and the reaction was allowed to proceed at 120° C. for 3 hours with stirring to give aromatic oligomers.

Upon completion of the reaction, the reaction mixture was left standing to form an organic layer and an aqueous layer containing the sulfuric acid at an approximate ratio of 280:80. To this reaction mixture were added 50 parts of toluene, 0.17 part of a nonionic surfactant (Demulfer D989 available from TOHO Chemical Industry Co., Ltd.) and 6.9 parts of NaOH corresponding to 20% in equivalent of the sulfuric acid equivalent (as an aqueous solution prepared by adding 20 parts of water) and the resulting mixture was stirred thoroughly. Thereafter, the mixture was transferred to a separatory funnel and left standing at 80° C. for one hour. The lower aqueous layer was separated and the organic layer and the aqueous layer were weighed. The organic layer amounted to 330 parts while the aqueous layer amounted to approximately 105 parts and contained a small amount of emulsion.

The organic layer was titrated with a 0.1N aqueous solution of sodium hydroxide and was found to contain 0.05% of the sulfuric acid. Furthermore, analysis of metals by ICP emission spectrometry indicated the presence of 100 ppm of sodium. The water content determined by the Karl Fischer reagent was 2000 ppm.

In a flask was placed 300 parts of the organic layer, 0.17 part of calcium carbonate equal to 1.1 times the acid in equivalent was added as an adsorbent and the mixture was stirred at 80° C. for 30 minutes. Foaming was observed in the initial stage of stirring. After completion of stirring, the residue formed by neutralization was removed by a suction filter to yield 297 parts of organic layer (a toluene solution of the aromatic oligomers). The concentration of sodium determined by ICP emission spectrometry was 1 ppm or less.

EXAMPLES 2–8

The aqueous layer was separated and the organic layer was treated with the adsorbent as in Example 1 except changing the amounts of nonionic surfactant and sodium hydroxide as shown in Table 1. It is seen that the amounts of the organic layer and emulsion change with a change in the amount of NaOH.

EXAMPLES 9–10

Experiments were carried out as in Example 1 except adding polyoxyethylene nonylphenyl ether (POENPE) or Demulfer D981 (available from TOHO Chemical Industry Co., Ltd.) with an HLB of 14 as a nonionic surfactant to the reaction mixture which had been left standing and the organic layer was separated from the aqueous layer and treated with the adsorbent.

In the case of POENPE, the aqueous layer amounted to approximately 110 parts and contained a small amount of emulsion while the organic layer contained 3000 ppm of water. The organic layer obtained after the adsorptive treatment and filtration amounted to 290 parts. In the case of Demulfer D981, the aqueous layer amounted to approximately 115 parts and contained a small amount of emulsion while the organic layer contained 3200 ppm of water. The organic layer obtained after the adsorptive treatment and filtration amounted to 288 parts. Other results are shown in Table 1.

EXAMPLES 11–17

Experiments were carried out as in Example 1 except using Demulfer D981 as a nonionic surfactant and changing the amounts of Demulfer D981 and sodium hydroxide as indicated in Table 1 and the organic layer was separated from the aqueous layer and treated with the adsorbent.

COMPARATIVE EXAMPLES 1–4

An attempt was made to separate the aqueous layer from the organic layer as in Example 1 except adding no sodium hydroxide, but the reaction mixture assumed an emulsified condition as a whole and could not be separated. The same condition was observed when the nonionic surfactant was changed to Demulfer D981 or POENPE.

Likewise, the same situation developed when an attempt was made to separate the aqueous layer from the organic layer as in Example 1 with no addition of the nonionic surfactant.

EXAMPLES 18–20

Experiments were carried out as in Example 1 except using cationic surfactants or 0.17 part of dimethyldidecylammonium chloride (DMDDAC), benzylcetyldimethylammonium chloride (BCDMAC) or trioctylmethylammonium chloride (TOMAC). The amount of calcium carbonate used in the adsorptive treatment was 0.34 part in Example 18 and 0.48 part in Examples 19 and 20. In any of the experiments, the product resin emitted an offensive odor.

The conditions and results are summarized in Table 1. The organic layer in each experiment is a toluene solution of aromatic oligomers and the concentration of solids is in the range of 60–66%. The yield of the aromatic oligomers recovered from the organic layer after separation of the toluene is in the range of 200–220 parts per 250 parts of naphthalene.

TABLE 1

| Example | Surfactant | Amount added | | Organic layer after separation | | | Organic layer after treatment with CaCO$_3$ | |
|---|---|---|---|---|---|---|---|---|
| | | Surfactant (ppm) | NaOH (part) | Na (ppm) | H$_2$SO$_4$ (%) | Organic layer (part) | Na (ppm) | H$_2$SO$_4$ (%) |
| 1 | D989 | 500 | 6.9 | 100 | 0.05 | 330 | <1 | 0 |
| 2 | D989 | 500 | 1.7 | 400 | 0.2 | 270 | <1 | 0 |
| 3 | D989 | 500 | 3.5 | 300 | 0.15 | 290 | <1 | 0 |
| 4 | D989 | 500 | 10.4 | 150 | 0.07 | 325 | <1 | 0 |
| 5 | D989 | 500 | 13.8 | 200 | 0.1 | 318 | <1 | 0 |
| 6 | D989 | 500 | 17.3 | 250 | 0.12 | 313 | <1 | 0 |
| 7 | D989 | 1000 | 6.9 | 100 | 0.05 | 330 | <1 | 0 |
| 8 | D989 | 2000 | 6.9 | 100 | 0.05 | 330 | <1 | 0 |
| 9 | POENPE | 500 | 6.9 | 160 | 0.07 | 325 | <1 | 0 |
| 10 | D981 | 500 | 6.9 | 165 | 0.08 | 320 | <1 | 0 |
| 11 | D981 | 500 | 1.7 | 450 | 0.23 | 260 | <1 | 0 |
| 12 | D981 | 500 | 3.5 | 375 | 0.18 | 275 | <1 | 0 |
| 13 | D981 | 500 | 10.4 | 215 | 0.11 | 315 | <1 | 0 |
| 14 | D981 | 500 | 13.8 | 290 | 0.15 | 300 | <1 | 0 |
| 15 | D981 | 500 | 17.3 | 320 | 0.18 | 292 | <1 | 0 |
| 16 | D981 | 1000 | 6.9 | 165 | 0.08 | 320 | <1 | 0 |
| 17 | D981 | 2000 | 6.9 | 165 | 0.08 | 320 | <1 | 0 |
| 18 | DMDDAC | 500 | 6.9 | 200 | 0.1 | 315 | <1 | 0 |
| 19 | BCDMAC | 500 | 6.9 | 210 | 0.14 | 300 | <1 | 0 |
| 20 | TOMAC | 500 | 6.9 | 205 | 0.12 | 307 | <1 | 0 |
| Comparative example | | | | | | | | |
| 1 | D989 | 500 | 0 | — | — | — | — | — |
| 2 | POENPE | 500 | 0 | — | — | — | — | — |
| 3 | D981 | 500 | 0 | — | — | — | — | — |
| 4 | | 0 | 6.9 | | | | | |

Industrial Applicability

According to the process of this invention, the organic layer containing aromatic oligomers can be separated from the aqueous layer in a simplified manner, which has been impossible to accomplish by the conventional processes, and metals can be removed and aromatic oligomers can be prepared with ease and enhanced purity.

What is claimed is:

1. A process for preparing aromatic oligomers comprising reacting an aromatic compound with formaldehyde in the presence of an acid catalyst to obtain a reaction mixture,
adding a surfactant, and a water-soluble alkali in an amount to neutralize 1–70% of the acid catalyst in the reaction mixture to improve the separability of the organic and aqueous layer in the reaction mixture, transferring the acid catalyst to the aqueous layer, and followed by separating the aqueous layer from the organic layer to remove the acid catalyst.

2. A process for preparing aromatic oligomers as described in claim 1 wherein the water-soluble alkali is sodium hydroxide.

3. A process for preparing aromatic oligomers as described in claim 1 wherein the aromatic compound is at least one selected from the group consisting of xylene, naphthalene, methylnaphthalene, dimethylnaphthalene, biphenyl, anthracene, phenanthrene and pyrene.

4. A process for preparing aromatic oligomers as described in claim 1 wherein the surfactant is a nonionic surfactant.

5. A process for preparing aromatic oligomers as described in any one of claims 1 to 4, which process further comprises dispersing an adsorbent in the organic layer separated from the aqueous layer, and filtering the dispersion of the organic layer to remove minute amounts of acids, water and metals remaining in the organic layer.

6. A process for preparing aromatic oligomers as described in claim 2 wherein the aromatic compound is at least one selected from the group consisting of xylene, naphthalene, methylnaphthalene, dimethylnaphthalene, biphenyl, anthracene, phenanthrene and pyrene.

7. A process for preparing aromatic oligomers as described in claim 2 wherein the surfactant is a nonionic surfactant.

8. A process for preparing aromatic oligomers as described in any one of claims 6 or 7, which process further comprises dispersing an adsorbent in the organic layer separated from the aqueous layer, and filtering the dispersion of the organic layer to remove minute amounts of acids, water and metals remaining in the organic layer.

9. A process for preparing aromatic oligomers as described in claim 5 wherein the adsorbent is calcium carbonate or calcium hydroxide.

10. A process for preparing aromatic oligomers as described in claim 5 wherein the metal is sodium.

11. A process for preparing aromatic oligomers as described in claim 8 wherein the adsorbent is calcium carbonate or calcium hydroxide.

12. A process for preparing aromatic oligomers as described in claim 8 wherein the metal is sodium.

13. A process for preparing aromatic oligomers as described in claim 1 wherein the alkali is added in an amount to neutralize 5–50% of the acid catalyst in the reaction mixture.

* * * * *